United States Patent [19]

Ellers et al.

[11] 4,260,288

[45] Apr. 7, 1981

[54] PIPE LAYING APPARATUS AND METHOD

[75] Inventors: Frederick S. Ellers, Menlo Park; Norman R. Wallace, San Francisco, both of Calif.

[73] Assignee: Bechtel International Corporation, San Francisco, Calif.

[21] Appl. No.: 963,669

[22] Filed: Nov. 27, 1978

[51] Int. Cl.³ .............................................. F16L 1/04
[52] U.S. Cl. .................................... 405/168; 405/158; 405/171
[58] Field of Search .................. 405/66, 158, 166, 168, 405/169, 170, 171

[56] References Cited

U.S. PATENT DOCUMENTS

| | | | |
|---|---|---|---|
| 3,512,367 | 5/1970 | McLallen | 405/171 |
| 3,855,835 | 12/1974 | Tisdale et al. | 405/168 X |
| 3,924,415 | 12/1975 | Goren et al. | 405/166 |
| 3,965,713 | 6/1976 | Horton | 72/146 |
| 3,982,402 | 9/1976 | Lang et al. | 405/168 |
| 4,089,178 | 5/1978 | Kinase et al. | 405/66 |
| 4,117,692 | 10/1978 | Öberg | 405/166 |

FOREIGN PATENT DOCUMENTS

| | | |
|---|---|---|
| 667802 | 7/1963 | Canada . |
| 2841979 | 4/1979 | Fed. Rep. of Germany . |
| 933100 | 8/1963 | United Kingdom . |
| 1507959 | 4/1978 | United Kingdom . |

*Primary Examiner*—David H. Corbin
*Attorney, Agent, or Firm*—John L. McGannon

[57] ABSTRACT

Apparatus and method for laying a pipeline on the bottom of an ocean wherein a wheel-like, buoyant body is adapted to carry a single, continuous length of pipe in the form of horizontal convolutions from a first site at which the pipe is wrapped on the body to a second site where the convolutions are moved into vertical positions and the pipe is unwrapped from the body and allowed to gravitate toward and to be laid on the bottom of the ocean. The pipe is wrapped on the body when the latter is horizontally disposed and floating on the water near a dock, and the wrapping can be accomplished whether the elastic bending limit of the pipe is exceeded or not. The body with the convolutions of pipe are towed to the second site while the body and the pipe remains horizontally disposed. Then a tank forming part of the body receives sea water to unbalance the body and cause it to be moved into a vertical position. In this position, the body is simultaneously towed forwardly and rotated about a horizontal axis below the upper level of the water to allow the pipe to be vertically unwrapped from the body and to gravitate therefrom. The body normally has a curvature less than the curvature at which the pipe exceeds its elastic bending limit; however the body could have a greater curvature for some specific uses. A second, smaller tank having a power actuated mechanism therein is coupled by gear means to the body near its outer periphery to rotate the latter upon actuation of the mechanism during a pipe laying operation. The mechanism can also be used to rotate the tank when the body is in a horizontal position near a dock to allow the pipe to be continuously wrapped onto the body after being formed from pipe segments connected together in end-to-end relationship.

26 Claims, 6 Drawing Figures

PIPE LAYING APPARATUS AND METHOD

This invention relates to improvements in the laying of a pipeline on the bottom of an ocean or other body of water and, more particularly, to apparatus and a method for laying a pipeline over distances and at water depth hertofore not accomplished with conventional techniques.

BACKGROUND OF THE INVENTION

The most advanced deep water pipe laying technique now in existence has severe limitations which make the cost of laying pipe excessively high. The maximum criteria of presently known methods include a pipe size of 16 inches in diameter, a maximum water depth of 2,000 feet and a reel radius of 27 feet for carrying the pipe. The maximum weight of a fully loaded reel at this radius is about 2,000 tons. Moreover, for pipes of the above size, the above reel radius causes the pipe wrapped on the reel to have a curvature greatly in excess of its elastic bending limit. This requires reforming apparatus for straightening the pipe as it is unwound from the reel and before it is laid on the bottom of the ocean. Such reforming damages the corrosion coating of the pipe and interrupts the pipe laying process. The coating must be repaired before laying of the pipe can proceed. Further, the reel must be stopped at 1,000 foot intervals to install anodes and cannot under any circumstances handle concrete coated pipe. All of the foregoing limitations and requirements increase the cost of laying a pipeline, and in many cases, the cost is so high that pipe laying plans are abandoned before they can be carried out. This is particularly so when the pipeline is laid under an open sea over several miles. In addition, no other known method of laying large diameter (i.e., 20 inches or greater) pipe for water depths greater than 3000 feet.

Typical disclosures which relate to the laying of pipe from surface vessels include U.S. Pat. Nos. 3,855,835 and 3,924,415, British Pat. No. 2884, and Canadian Pat. No. 667,802. All of these disclosures set forth structures which inherently contain some or all of the above limitations.

For the foregoing reasons, a need has arisen for an improved apparatus and method for laying a pipeline at great water depths and over long distances.

SUMMARY OF THE INVENTION

The present invention satisfies the aforesaid need by providing apparatus and method for laying a pipeline at great water depths over long distances. A relatively long length of pipe is floated in a body of water in horizontal convolutions whose curvatures are normally less than but could be greater than that at which the pipe exceeds its elastic bending limit. After the convolutions reach a site at which pipe laying is to commence, they are moved into generally vertical positions while still floating in the water and are then unwound as they are advanced through the water, whereupon the pipe is caused to gravitate and to be laid on the bottom of the body of water.

The pipe is wound on a buoyant body which is the means or pipe carrier by which the pipe is transported to the loading site, the body having a circular tank capable of floating the body on the water as the pipe is wound thereon in the form of convolutions. Means is provided to rotate the body as the pipe is wound thereon, and the pipe is formed from pipe segments which are connected together in end-to-end relationship to form a single length of pipe.

With the body still horizontally disposed and with the convolutions of pipe wrapped on the body, the body is towed to a second site, and water is admitted into a part of the tank to cause an unbalanced vertical force to be exerted thereon. This causes the body to pivot from its horizontal position to a vertical position and to remain in said vertical position extending partially out of the water while the body is pulled forwardly and caused to rotate about a horizontal axis which is below water level. As the body moves forwardly and rotates, the pipe is unwrapped from the body and gravitates toward and onto the bottom of the body of water and, in so doing, returns to its normal, straight condition either due to the fact that the elastic bending limit of the pipe has previously not been exceeded when the pipe was initially wrapped on the body or because the negative buoyancy of the pipe is great enough to offset a minor initial set due to exceeding the elastic bending limit of the pipe.

The body can be rotated and moved in the opposite direction to cause pipe laid on the bottom to be lifted and wrapped on the body for eventual return to a dock or other facility. As soon as all of the pipe has been raised, the body can be purged of water to cause the body to once again assume a horizontal position, following which the body can then be towed in the horizontal position to a dock or other facility at which the pipe wrapped on can be removed from the body.

The primary object of the present invention is to provide apparatus and method for carrying pipe in the form of horizontal convolutions over a body of water to a pipe laying site, then tilting the convolutions into vertical positions so that the convolutions can be moved forwardly through the water and unwrapped to cause the pipe to gravitate toward and to be laid on the bottom of the water along the pipe laying route.

Another object of this invention is to provide apparatus and method of the type described wherein the convolutions of pipe have curvatures less than the curvature at which the pipe exceeds its elastic bending limit so that the pipe need not be reformed as it is unwrapped and before it is laid on the bottom of a body of water.

A further object of this invention is to provide apparatus and method of the aforesaid character wherein a single, continuous length of relatively large size pipe can be wrapped onto and unwrapped from a wheel-like body of large diameter so that the pipe can be formed from pipe sections welded in end-to-end relationship immediately before the pipe sections are wrapped onto the body and the pipe can be used to form an undersea pipeline extending over a greater distance and laid at a deeper depth than has been possible with conventional pipe laying equipment.

Another object of this invention is to provide apparatus and a method of laying pipe which is not influenced by surface waves and swell since the water plane is only a few hundred square feet while the underwater mass is of the order of 100,000 tons so that the apparatus has a much greater stability in a given sea than any conventional pipe laying apparatus.

Other objects of this invention will become apparent as the following specification progresses, reference being had to the accompanying drawings for illustrations of the invention.

IN THE DRAWINGS

Figure 1:
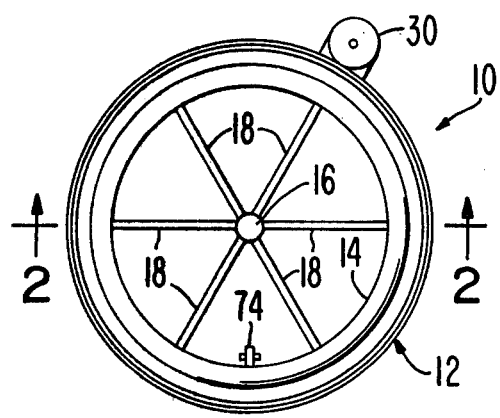
FIG. 1 is a top plan view of the pipe carrier of this invention.
Figure 2:
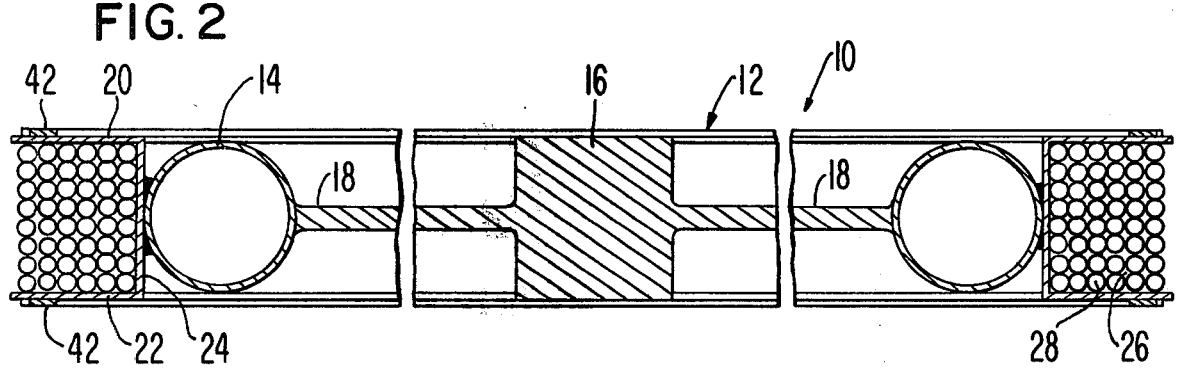
FIG. 2 is an enlarged cross-sectional view taken along line 2—2 of FIG. 1.
Figure 3:
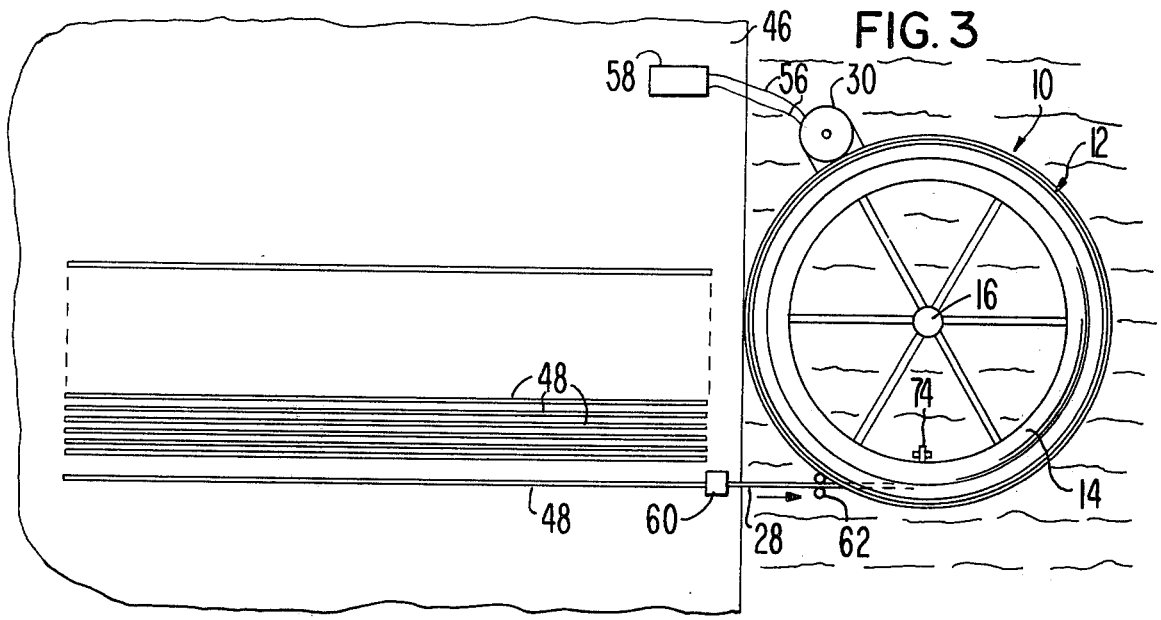
FIG. 3 is a view similar to FIG. 1 but showing a way in which pipe is loaded on the pipe carrier near a dock.

The pipe carrier of the present invention is broadly denoted in FIG. 1 by the numeral 10 and includes a wheel-like structure or body 12 comprised of a generally toroidal buoyancy tank 14, a central hub 16, and a plurality of generally radial spokes or braces 18 spanning the distance between and connected to tank 14 and hub 16. As shown in FIG. 3, body 12 further includes a pair of annular flanges 20 and 22 adjacent to opposite sides of tank 14 and projecting radially outwardly therefrom. An annular band 24 surrounds the outer periphery of tank 14 and is secured thereto, such as by welding, the opposite sides of band 24 being rigidly secured, such as by welding, to flanges 20 and 22 as shown in FIG. 2.

Figure 5:
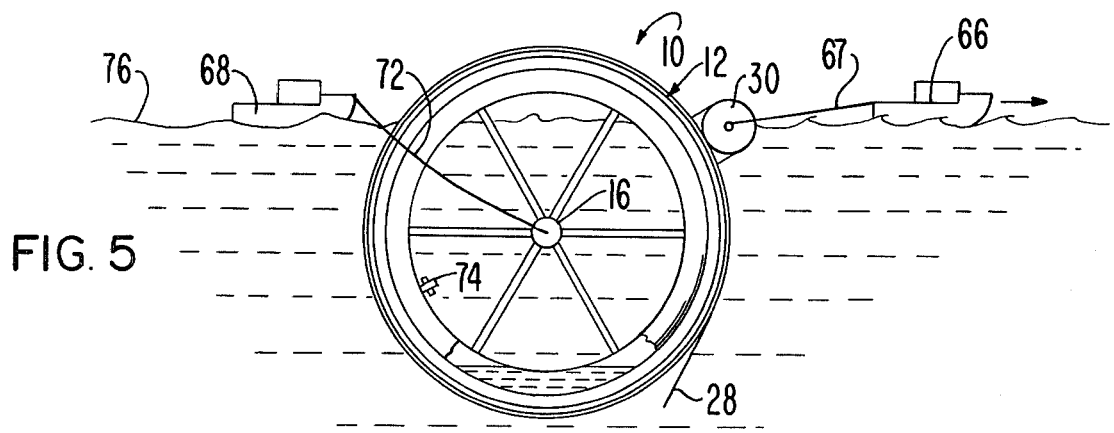
FIG. 5 is a view similar to FIG. 1 but showing the pipe carrier during a pipe laying operation.

Flanges 20 and 22 and band 24 define an outer peripheral space 26 (FIG. 2) for receiving a number of wraps or convolutions of a single, continuous length of pipe 28 that is to be carried by body 12 from a first site (FIG. 3) at which the pipe is loaded onto the body to a second site (FIG. 5) where the pipe is to be unwound from the body and laid on the bottom of a body of water, such as the ocean.

Body 12 will normally have sufficiently large diameter so that the elastic bending limit of the pipe which is selected to be carried by the body will not be exceeded when the pipe is wrapped onto the body; thus, the pipe will not suffer a permanent set or deformation and it will assume a substantially straight configuration after it has been unwrapped from body 12 and laid on the bottom of a body of water. In this way, the pipe does not require reforming when it is unwrapped from body 12 during a pipe laying operation as hereinafter described. However, the diameter of body 12 could be such that the elastic bending limit of the pipe is exceeded when the pipe is wrapped on the body. In such a case, the negative buoyancy of the pipe will usually be great enough to avoid the need for reforming and to offset a minor initial set due to exceeding the elastic bending limit.

Tank 14 can be constructed in any suitable manner. For instance, tank 14 can be formed from a number of tubular segments connected in end-to-end relationship with the opposed, open ends of each segment being closed by perforable diaphragms. These diaphragms allow the segments to be interconnected, and the diaphragms can be opened and closed in any suitable manner after tank 14 has been constructed to place the segments in fluid communication with each other.

The size of body 12 will be governed by the cross-section and length of pipe 28 required for the particular pipe laying job which is to be accomplished using body 12. Thus, the body has no range of critical dimensions although it will normally be large enough to carry and unwrap a sufficient length of pipe and its curvature will normally be sufficiently small to avoid the formation of a permanent set or deformation in the pipe.

To carry out the pipe laying method of this invention, body 12 is most practical for use in laying a pipeline at water depths in excess of 2000 feet over a relatively long distance. The diameter of body 12 will typically be, for the selected pipe for a particular job, slightly above the minimum required to avoid such permanent set in the pipe.

To illustrate the use of pipe carrier 10 but without limiting its application, body 12 can be used to lay pipe along a distance of 100 miles to a maximum depth of 8500 feet. For this underwater pipeline, the diameter of body 12 will be about 800 feet for pipe 28 having a 20 inch outside diameter and a wall thickness of about 1.33 inches. Space 26 of body 12 will hold about 236 wraps of this pipe, and this length of pipe will be equivalent to the 100 miles of pipe laying distance. A suitable pipe material for this is a type of steel known as X60 which, in the configuration used for purposes of illustration, will not be stressed beyond 95 percent of its elastic limit.

In the above example, the outer diameter of a cross-section of tank 14 will be about 30 feet. Also, pipe 28 will have a suitable coating on it, typically only a corrosion coating; however, the pipe could have a concrete coating which would not be materially damaged in any way when the pipe is wrapped onto or unwrapped from body 12. For the above size and type of pipe, without a concrete coating, the weight of the pipe will be about 90,000 tons.

Body 12 has a reaction buoyancy tank 30 coupled therewith for controlling the wrapping of pipe onto body 12 and the unwrapping of pipe from the body during a pipe laying operation. Tank 30 as shown in FIG. 1a is generally cylindrical in configuration and its diameter and axial length are approximately equal to the cross-sectional diameter of tank 14, i.e., about 30 feet in the above example.

Figure 1A:
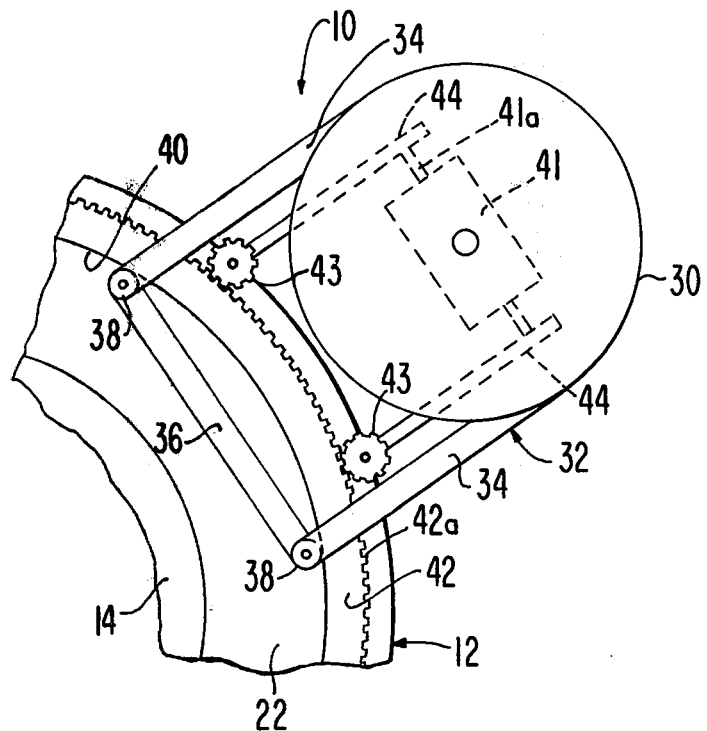
FIG. 1a is an enlarged, fragmentary plan view of the pipe carrier showing the wheel-like body thereof and the reaction buoyancy tank and gear apparatus at one side of the body.

Tank 30 is held in the plane of body 12 and coupled thereto by a frame 32 having first and second pairs of generally parallel legs 34 rigidly secured to tank 30 and extending laterally therefrom to the body, only one pair of legs 34 being shown in FIG. 1a, the other pair being near the opposite side of body 12. The frame has a cross piece 36 for each pair of spaced legs 34, respectively, and the junctions between each cross piece 36 and the respective pair of legs 34 include a pair of rollers 38 which are in rolling engagement with an inner peripheral face 40 of a respective ring gear 42 rigidly secured to the outer face of the adjacent flange, such as flange 22 shown in FIG. 1a, near its outer periphery. Another ring gear 42 is mounted on the opposite side of the body (FIG. 2).

Tank 30 contains a power actuated mechanism 41, such as a hydraulic or pneumatic motor, provided with a drive shaft 41a coupled at its ends thereof to two pairs of spur gears 43 by suitable motion transfer members, such as endless chains. Only a single pair of spur gears is shown in FIG. 1a. Each pair of spur gears 43 is in mesh with the outer peripheral teeth 42a of a respective ring gear 42, as shown in FIG. 1a so that, when power device 41 is actuated, gears 43 are rotated to move tank 30 relative to and about body 12. Typically, the source of energy to operate mechanism 41 will be remote from tank 30, such as on a dock or on a power driven vessel. Frame 32 couples tank 30 to body 12 and allows relative movement between body 12 and tank 30 because rollers 38 engage the inner peripheral face 40 of ring gear 42.

FIG. 3 shows the way in which pipe 28 is wrapped onto pipe carrier 10. To accomplish this, pipe carrier 10 is positioned adjacent to a dock 46 on which a number of pipe segments 48 are positioned. Segments 48 can have any desired length. Typically, the segments will be pre-assembled in lengths in the range of 800–900 feet.

Body 12 is located sufficiently close to dock 46 and is held against movement away from the dock by suitable anchor means (not shown). Also, reaction buoyancy tank 30 is secured by suitable anchor means (not shown) to dock 46. Fluid flow lines 56 coupled with power mechanism 41 (FIG. 1a) are coupled to a suitable source 58 of energy on dock 46 to permit mechanism 41 to be actuated to cause relative movement between body 12 and tank 30. In practice, tank 30 will be stationary and body 12 will be incrementally rotated relative to tank 30 in a counterclockwise direction when viewing FIG. 3 during a pipe loading operation.

To commence the pipe loading operation, a first pipe segment 48 is coupled in some suitable manner to body 12 in space 26 thereof and body 12 is rotated in a counterclockwise direction about the axis of hub 16 relative to dock 46 by actuating power mechanism 41 in tank 30 to cause the first pipe segment to be wrapped on body 12. When the end of the first pipe segment 48 reaches a tie-in station 60 (FIG. 3) on dock 46, a second pipe segment 48 is secured, such as by welding, to the end of the first segment, and body 12 is again rotated to wrap the second pipe segment 48 thereon. The pipe segments pass through a level wind guide 62 as the segments move onto the body. The welds can be tested in the conventional manner before the pipe segments are wrapped onto body 12.

The remaining pipe segments 48 are successively coupled together and wrapped onto body 12 in the manner described above and, when the proper length of pipe is wrapped on body 12, the body is ready to be towed in a loaded condition to a site at which the pipe is to commence to be laid on the bottom of a body of water.

Figure 4:
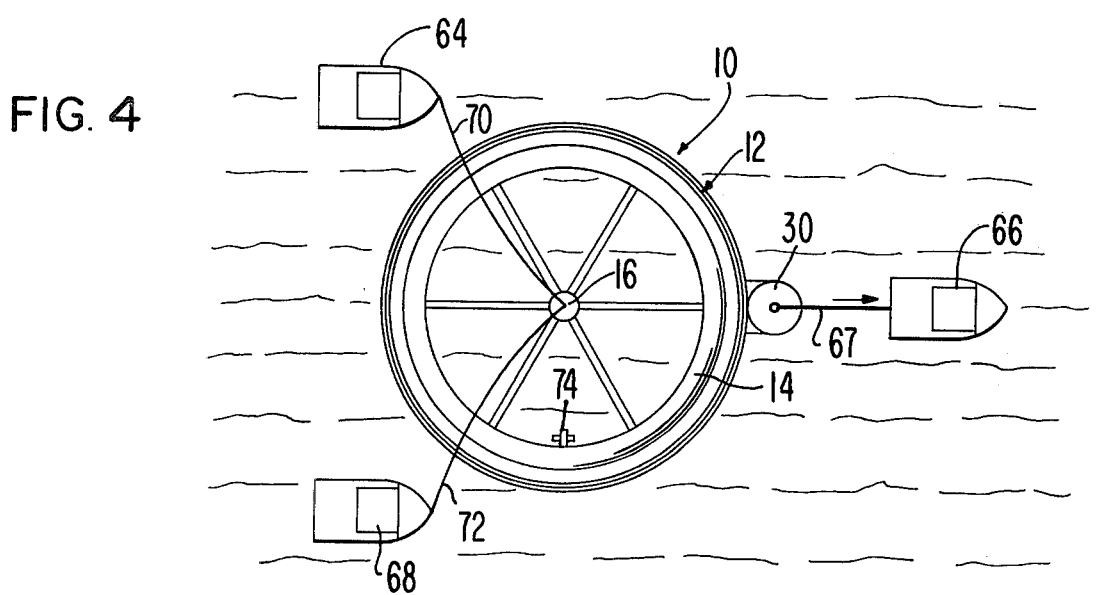
FIG. 4 is a top plan view of the pipe carrier showing a way in which it is towed toward a pipe laying site.

FIG. 4 illustrates the way in which the body is towed to a pipe laying site by a number of tugboats 64, 66 and 68. Body 12 is towed in a horizontal condition to the pipe laying site by tugboat 66 connected by a line 67 to body 12, tugboats 64 and 68 serving to provide lateral control for the body as it is pulled forwardly by tugboat 66. Lines 70 and 72 from hub 16 are coupled to respective tugboats 64 and 68 to provide such lateral control.

When body 12 reaches the site at which the pipe laying operation is to commence, one or more valves on tank 14, such as 74 on the inner periphery of tank 14, is opened to allow a small volume of sea water to enter tank 14. Valve 74 can be controlled manually by a skin diver or remotely from one of the tugboats by means of a control line extending between the valve and the tugboat. Shortly after the valve is opened, the sea water entering tank 14 will cause body 12 to become unbalanced and this unbalance will cause the body to move from the horizontal position of FIG. 4 to a generally vertical position shown in FIG. 5 with hub 16 below the upper level 76 of the body of water. Tank 30 will, because of its buoyancy, remain near upper water level 76, and the major part of body 12 will be below this level.

Tugboat 66 will move body 12 forwardly during a pipe laying operation as tugboats 64 and 68 provide lateral control of the body. Actuation of power mechanism 41 will cause spur gears 43 to rotate ring gears 42 and thereby rotate body 12 in a clockwise sense when viewing FIG. 5. During this forward movement of the body and rotation of the body about hub 16, pipe 28 is unwrapped from body 12 and allowed to descend and to be progressively laid on the bottom of the body of water. The pipe laying operation continues until all of the pipe has been unwound from body 12.

As pipe 28 is unwrapped from body 12 and descends to the bottom of the water, the pipe will assume a substantially straight configuration on the bottom so that the pipe need not be reformed after it is unwrapped from body 12. For this reason, there is no need for additional structure on pipe carrier 10 for reforming the pipe.

Pipe carrier 10 can also be used to raise pipe from the bottom of a body of water. To this end, body 12 will be in the vertical position of FIG. 5 and power mechanism 41 in tank 30 will cause rotation of body 12 in a counterclockwise direction when viewing FIG. 5 while the body is being moved to the left by a tugboat or the like. During this time, the pipe will be wrapped onto body 12 in space 26 and following the wrapping of all of the pipe, a suitable pump can be used to purge the water in tank 14 so that body 12 will again be subjected to an unbalanced force and be caused to pivot from its vertical position to the horizontal position of FIG. 4, after which body 12 can be towed back to a dock or other facility for unloading of the pipe.

We claim:

1. A method of carrying and laying pipe under a body of water comprising: wrapping a single length of pipe in horizontal convolutions at a first site; moving the pipe convolutions through a body of water to a second site as the convolutions are floated in the water and remain substantially horizontal; pivoting the convolutions at the second site so that they are generally vertically disposed and at least partially submerged in said body of water; and rotating the vertically disposed convolutions about a generally horizontal axis while simultaneously advancing the convolutions along a generally horizontal path through the water to unwrap the convolutions and to allow the pipe to gravitate toward and to be laid on the bottom of the body of water.

2. A method as set forth in claim 1, wherein is included the step of providing a generally annular, buoyant body, said wrapping step including rotating the body to cause the pipe to be wound about the body when the latter floats on said body of water.

3. A method as set forth in claim 2, wherein the step of rotating the body is performed adjacent to a dock, and including the steps of providing a plurality of pipe segments on the dock, and connecting the pipe segments in end-to-end relationship to form said single length of pipe.

4. A method as set forth in claim 3, wherein the body is held against movement laterally of the dock as the pipe is wound about the body, said step of rotating the body includes applying a rotational force to the body near the outer periphery thereof.

5. A method as set forth in claim 1, wherein the horizontal axis is below the upper level of the body of water.

6. A method as set forth in claim 1, wherein said pivoting step includes applying an unbalanced vertical force to the convolutions of pipe when the convolutions are generally horizontally disposed.

7. A method of carrying and laying pipe under a body of water comprising: providing a generally annular, buoyant body; wrapping a single length of pipe in horizontal convolutions about the buoyant body at a first site; moving the pipe convolutions across a body of water to a second site as the convolutions remain substantially horizontal; admitting water into a part of said buoyant body at the second site to apply an unbalanced force on the convolutions when the convolutions are horizontally disposed so that the convolutions will become generally vertically disposed in said body of water; and rotating the vertically disposed convolutions about a generally horizontal axis while simultaneously advancing the convolutions along a generally horizontal path through the water to unwrap the convolutions from said buoyant body and to allow the pipe to gravitate toward and to be laid on the bottom of the body of water.

8. A method as set forth in claim 7, wherein the water remains substantially in the lower part of said body when the convolutions are unwrapped therefrom.

9. A method as set forth in claim 7, wherein said step of moving the convolutions to the second site includes pulling the convolutions and providing lateral control thereof.

10. A method as set forth in claim 7, wherein the body is circular and has a curvature less than the curvature at which the pipe exceeds its elastic bending limit.

11. A method as set forth in claim 7, wherein the pipe has an elastic bending limit, said wrapping step including winding the pipe into the shape of said convolutions without exceeding the elastic bending limit of the pipe.

12. A method as set forth in claim 7, wherein said pipe has an elastic bending limit, said wrapping step including winding the pipe into the shape of said convolutions while exceeding the elastic bending limit of the pipe.

13. A method of carrying and laying pipe under a body of water comprising: providing a circular buoyant body; floating the body on water at a first site with the body generally horizontally disposed; rotating the body about a generally vertical axis; wrapping a single length of said pipe in convolutions about said body as the body is rotated about said vertical axis; moving the body and convolutions of pipe to a second site as the body remains horizontal and floats on the water; admitting a volume of water into a part of the body at the second site to cause an unbalanced force to be exerted on the body and to cause the body and the pipe convolutions to pivot from a horizontal position to a generally vertical position; moving the vertically disposed body and pipe convolutions in one direction through the water; and rotating the body and the pipe convolutions about a horizontal axis below the upper surface of the water as the body and the pipe convolutions remain vertically disposed to unwrap the pipe and allow it to gravitate toward and to be laid on the bottom of the water.

14. A method as set forth in claim 13, wherein the step of rotating the body and the pipe convolutions includes applying a rotational force to the body near its outer periphery.

15. A method as set forth in claim 13, wherein the rotational force is applied to said body near the upper level of said body of water.

16. A method as set forth in claim 13, wherein the pipe has an elastic bending limit, said body having a curvature less than the curvature at which the pipe exceeds said elastic bending limit.

17. A method as set forth in claim 13, wherein the pipe has an elastic bending limit, said body having a curvature greater than the curvature at which the pipe exceeds said elastic bending limit.

18. Apparatus for carrying and laying pipe under a body of water comprising: a buoyant body having a portion capable of receiving and containing a liquid and having a means for defining an outer peripheral space thereon for receiving a number of convolutions of said pipe, said buoyant body having a generally central rotational axis and being adapted to float in a body of water when the buoyant body is in a first position with said axis generally horizontal or in a second position with the axis generally vertical; valve means coupled with said buoyant body to permit a liquid to be directed into or out of said portion of the buoyant body to cause an unbalanced force to be exerted thereon when the buoyant body is in one of said positions, whereby the buoyant body will move into the other position; and means carried by said buoyant body for rotating the latter about said axis when the buoyant body is floating on a body of water and when the body is in either of said positions.

19. Apparatus as set forth in claim 18, wherein said body has a central hub, a circular tank surrounding the hub, and a number of braces extending radially of the hub and interconnecting the latter and said tank.

20. Apparatus as set forth in claim 19, wherein said space defining means includes a pair of spaced flanges adjacent to opposed sides of the tank, and an annular band spanning the distance between the flanges and secured to the outer periphery of the tank.

21. Apparatus for carrying and laying pipe under a body of water comprising: a buoyant body capable of receiving and containing a liquid and having a means for defining an outer peripheral space thereon for receiving a number of convolutions of said pipe, said buoyant body adapted to float in a body of water when the buoyant body is in either a horizontal position or a vertical position; valve means coupled with said buoyant body to permit a liquid to be directed into or out of the buoyant body to cause an unbalanced force to be exerted thereon when the buoyant body is in one of said positions, whereby the buoyant body will move into the other position; and a buoyant tank carried by said buoyant body adjacent to the outer periphery of the buoyant body for rotating the latter about an axis through the buoyant body when the buoyant body is floating on a body of water and when the buoyant body is in either said horizontal position or said vertical position, said tank having a power-actuated mechanism therein, and means coupling the power-actuated mechanism to the buoyant body for rotating the latter relative to the tank.

22. Apparatus as set forth in claim 21, wherein the buoyant body has a ring gear near the outer periphery thereof, and gear means connecting the ring gear to said power actuated mechanism.

23. Apparatus as set forth in claim 21, wherein is included a pair of ring gears carried by said buoyant body on respective, opposed sides thereof near its outer periphery, there being a frame on said tank, the frame being shiftably coupled to the ring gears on the inner peripheries of the ring gears, there being gear means connecting said power actuated mechanism with said ring gears.

24. Apparatus as set forth in claim 23, wherein each ring gear has an inner peripheral face, the frame having a pair of spaced rollers in rolling engagement with the inner peripheral face of a respective ring gear.

25. Apparatus as set forth in claim 21, wherein the pipe has an elastic bending limit, the defining means of said buoyant body being generally circular and having a curvature less than the curvature at which the pipe exceeds said elastic bending limit.

26. Apparatus as set forth in claim 21, wherein the pipe has an elastic bending limit, the defining means of said buoyant body being generally circular and having a curvature greater than the curvature at which the pipe exceeds said elastic bending limit.

* * * * *